3,089,904
OXONATION OF 1,5,9-CYCLODODECATRIENE
Samuel B. Lippincott, Springfield, Peter P. Klemchuk, Nixon, and Jeffrey H. Bartlett, New Providence, N.J., assignors to Esso Research and Engineering Company, a corporation of Delaware
No Drawing. Filed Mar. 2, 1959, Ser. No. 796,206
11 Claims. (Cl. 260—514)

The present invention relates to new compositions of matter and to methods of preparation of these new compositions of matter. More particularly, this invention relates to the preparation of the mono- and dialdehydes of 1,5,9-cyclododecatriene, i.e. cyclododecanecarboxaldehyde and 1,$x$-cyclododecanedicarboxaldehyde, where $x$ is a number selected from the group consisting of 4, 5 and 6. Further, this invention relates to (1) hydrogenating these aldehydes respectively to cyclododecylcarbinol and 1,$x$-cyclododecyldicarbinol or alternatively to (2) oxidizing these aldehydes respectively to cyclododecanecarboxylic acid and 1,$x$-cyclododecanedicarboxylic acid, all of these also being new compositions of matter and wherein $x$ is again a number selected from the group 4, 5 and 6. Additionally, this invention relates to processes for the preparation of the above described new compositions of matter.

The cyclododecatriene starting material of this invention is known in the art, being prepared by trimerizing butadiene with alkyl metal type catalysts, its preparation and description being disclosed for example in Angewandte Chemie, v. 69, No. 11:397 (June 7, 1957). Although four stereo isomers of 1,5,9-cyclododecatriene are theoretically possible only two have thus far been isolated. These are the cis, trans, trans (cis., tr., tr.) and the trans, trans, trans (tr., tr., tr.) as shown by the following formulas.

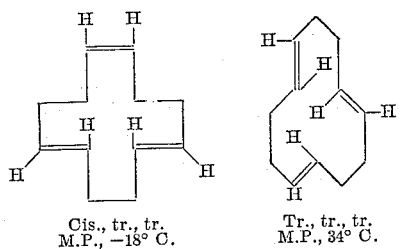

Cis., tr., tr.
M.P., −18° C.

Tr., tr., tr.
M.P., 34° C.

Throughout this specification it will be assumed that either of the isomers above represented or of the other isomers may be utilized or mixtures thereof.

The cyclododecylmonocarboxaldehyde and cyclododecyldicarboxaldehyde are useful as intermediates in the preparation by hydrogenation of the alcohol or dialcohol and the preparation by oxidation of the acid or diacid. Cyclododecylcarbinol is found useful in the preparation of synthetic lubricants and as a plasticizer. Specifically, the phthalate ester of normal butyl and cyclododecylcarbinol has been found to be a good plasticizer for polyvinyl chloride. Data comparing this material with a conventional plasticizer dioctyl phthalate is presented in Example 1. With reference to cyclododecyldicarbinol this material will have utility in polyesters, synthetic lubes and plasticizers particularly since it is a difunctional alcohol. Additionally, cyclododecylcarbinol is useful as an intermediate to be oxidized to the acid. The acid has now been found to be of value in the form of its lead cobalt and manganese salts as a drier in alkyd resin paints. Data indicating that driers so prepared compare favorably with lead, cobalt and manganese naphthanates which are conventional driers are represented in Example 2. Additionally, cyclododecylcarboxylic acid will find uses in agricultural applications as a defoliant, weed killer, cricket repellent, etc. With respect to the diacid, cyclododecyldicarboxylic acid, this material will be very useful in the preparation of polyesters, alkyds, synthetic lubricants and plasticizers, its difunctionality and high molecular weight lending it distinctive properties.

The aldehydes and dialdehydes of this invention are prepared by oxonating 1,5,9-cyclododecatriene with carbon monoxide and hydrogen at temperatures of 100–225° C., pressures of 1000–5000 p.s.i.g. with hydrogen to carbon monoxide ratios being 0.1/1 to 10/1 preferably 0.3/1 to 5/1. Suitable oxonation catalysts are cobalt carbonyl and rhodium carbonyl and compounds which can be converted in situ to the metal carbonyls such as cobalt carbonate, cobalt acetate, cobalt oleate, and other cobalt salts. Additionally, any of the other well known oxo catalysts may also be used. By this reaction monaldehydes and dialdehydes are prepared along with small amounts of cyclododecene and other side products. The relative proportions of the mono- and dialdehydes obtained in this reaction may be controlled by altering the reaction temperature, concentration of catalyst, and carbon monoxide/hydrogen ratio.

To obtain preferentially the monoaldehyde it is preferred to utilize hydrogen to cyclododecatriene ratios in the range of .08 to 1.5:1 and ratios of hydrogen to carbon monoxide in the range of 0.3 to 1:1. It is possible thus to efficiently control the oxonation reaction to obtain preferentially the monoaldehyde and at the same time to retain the high levels of carbon monoxide in the reaction zone required to maintain the activity of the carbonyl catalyst.

Preparation of the mono- and dialcohols from the mono- and dialdehydes is obtained by hydrogenating in the presence of any of the well known hydrogenation catalysts such as nickel or copper chromite catalyst at temperatures of 130° C. to 200° C. and pressures of 1000 to 5000 p.s.i. Hydrogenation is conducted to saturation or until hydrogen ceases to be consumed in the reaction. Utilizing noble metal catalysts supported or unsupported pressures of atmospheric to 100 p.s.i.g. and temperatures of 20–100° C. are used.

Oxidation of the monoaldehyde to the monoacid and of the dialdehyde to the diacid is obtained by reacting these as follows: (a) air oxidation, preferably using a hydrocarbon solvent such as benzene or heptane, (b) utilizing an oxygen containing gas in the presence of a cobalt catalyst and acetic acid, (c) utilizing performic acid in formic acid and (d) utilizing sodium dichromate in acetic acid; all of these being at temperatures of 20–100° C. and pressures of 15–100 p.s.i.g. preferably 15 p.s.i.g. Other catalysts and reaction conditions may also be utilized.

The monoacid and diacid may also be obtained from the mono alcohol or glycol by reaction with potassium permanganate in acetone with sodium dichromate in acetic acid or with chromic acid and sulfuric acid at temperatures of 20–100° C. and pressures of 15–100 p.s.i.g. Other oxidizing agents and catalysts at suitable reaction conditions may also be utilized.

In all of the above reactions suitable crystallization, distillation, etc. may be used to obtain purification of the products described.

The following examples present data obtained in the laboratory which help to define this invention.

EXAMPLE 1

*Plasticizer Data for n-Butyl Cyclododecylmethyl Phthalate*

| Original properties | Dioctyl phthalate | n-Butyl cyclododecylmethyl phthalate |
|---|---|---|
| Tensile (p.s.i.) | 3,020 | 3,270 |
| Elongation (percent) | 305 | 240 |
| Modulus (p.s.i.×10⁻⁴): | | |
| −25 | 1.7 | 4.83 |
| −15 | 1.0 | 3.95 |
| 0 | 0.19 | 2.90 |
| 15 | 0.042 | 0.76 |
| 25 | 0.024 | 0.13 |
| Aged 7 days at 100° C.: | | |
| Tensile (p.s.i.) | 2,870 | 3,089 |
| Elongation (percent) | 230 | 180 |
| Percent tensile retained | 95.1 | 94.5 |
| Percent elongation retained | 75.4 | 75.0 |
| Percent plasticizer loss | 20.0 | 2.3 |

It can be seen from the above data that the volatility of the present invention plasticizer at 100° C. is greatly superior to that of dioctyl phthalate. Additionally, the tensile and elongation properties of the polymers plasticized with the present invention n-butyl cyclododecylmethyl phthalate compare favorably with polymers plasticized with prior art dioctyl phthalate. These superior properties offset for many uses the poorer modulus of elasticity obtained using the present invention plasticizer. n-Butyl cyclododecylmethyl phthalate is prepared by reacting dibutyl phthalate with cyclododecylcarbinol in toluene with sodium methoxide catalyst to obtain the ester. Distillation of the n-butanol-toluene azeotrope is carried out during the reaction.

EXAMPLE 2

*Paint Drier Data*

| No. | Composition | Drying rate [1] | | | | | Film hardness (Sward) [2] | | | Film hardness (pencil) | | |
|---|---|---|---|---|---|---|---|---|---|---|---|---|
| | | 1 hr. | 2 hr. | 3 hr. | 4 hr. | 18 hr. | 2 day | 4 day | 10 day | 2 day | 4 day | 10 day |
| 1 | Alkyd plus 0.03% Co plus 0.3% Pb—salt of Standard Driers | 3 | 1 | 0 | 0 | 6 | 8 | 20 | 24 | 6B | H | 2H |
| 2 | Alkyd plus 0.03% Co plus 2.5% Pb—salt of Test Driers | 3 | 1 | 0 | 0 | 6 | 10 | 18 | 22 | 6B | F | 2H |
| 3 | Alkyd plus 0.03% Co plus 0.2% Pb plus 0.03% Mn—salt of Standard Driers | 3 | 3 | ½ | 0 | 6 | 10 | 20 | 20 | 6B | F | 2H |
| 4 | Alkyd plus 0.03% Co plus 0.2% Pb plus 0.03% Mn—salt of Test Driers | 3 | 3 | ½ | 0 | 4 | 8 | 20 | 20 | 6B | F | 2H |

[1] 0=Tack free; 9=wet.
[2] In percent, based on plate glass equals 100.

In the above table the Standard Driers salts were lead, cobalt, and manganese naphthanates which are conventionally used as driers. The Test Driers salts were lead, cobalt, and manganese salts of the present invention cyclododecylcarboxylic acid. It can be seen that the present invention driers compared very favorably with conventionally used driers for alkyd resins.

EXAMPLE 3

Cis, trans, trans-1,5,9-cyclododecatriene (27.0 g.; 0.50 eq.; 0.167 mole), 50 ml. of n-heptane, 1.25 g. (0.005 mole) of cobalt acetate tetrahydrate and 0.792 g. (0.100 mole) of pyridine were charged to a 300 ml. bomb. The bomb was flushed with nitrogen and then was pressured to 2400 p.s.i. with 1/1—$CO/H_2$. The bomb was heated to 150° C. Within 100 minutes, the pressure had dropped from 3200 to 1600 p.s.i. Then the bomb was repressured to 2900 p.s.i. and heating was continued at 150° C. for an additional 2¾ hours. The total gas consumption was 77.2% of the quantity required for the oxonation of the three double bonds.

EXAMPLE 4

The reaction product from Example 3 was hydrogenated with copper chromite catalyst at 150° C. for 6½ hours. The reaction product was filtered and evaporated in vacuo. The residue was distilled in vacuo. There were three fractions collected:

| Fraction | Weight (yield) | Boiling point | Hydroxyl number | Identity |
|---|---|---|---|---|
| I | 1.3 g | To 112.5° C. (2 mm.) | | |
| II. $n_D^{25}$=1.4913 | 11.7 g. (35.4%) | 112.5–113.5° C. (2 mm.) | [1] 256.5 | Cyclododecylcarbinol. |
| III | 7.1 g. (18.6%) | 164–168° C. (1.5 mm.) | [2] 427.5 | Cyclododecyldicarbinol. |

[1] Theory equals 283.  [2] Theory equals 491.

The cyclododecylcarbinol formed was analyzed and was found to contain 78.50% carbon and 13.30% hydrogen. This checked closely with calculated values of 78.72% for carbon and 13.21% for the hydrogen.

EXAMPLE 5

*Oxonation of Cyclododecatriene*

Cis, trans, trans-1,5,9-cyclododecatriene (135 g.; 0.831 mole; 2.49 eq.), 250 ml. of n-heptane, 3.1 g. of cobalt acetate tetrahydrate and 1.98 ml. of pyridine were charged to a 3000 ml. pressure vessel. The reactor was purged with nitrogen and pressured to 2400 p.s.i. with 1/1—$CO/H_2$. The reactor was heated to 150° C. Within three hours the pressure dropped from 3900 p.s.i. to 3050 p.s.i. The reactor was allowed to cool.

Distillation of the reaction product yielded six fractions:

| Fraction | Boiling point (1.5 mm.) | Weight (g.) | Bromine number | Number double bonds/ 100 g. | Number double bonds/ mole of aldehyde | Free carbonyl | Percent aldehyde | Hydroxyl number (percent alcohol) |
|---|---|---|---|---|---|---|---|---|
| 1 | 70 –105 | 15.4 | 69.6 | 0.44 | | 106.9 | | |
| 2 | 105 –108.5 | 55.4 | 24.5 | 0.15 | 0.29 | 258.4 | [1] 90.4 | 39.3 (13.9) |
| 3 | 108.5–144 | 9.5 | 21.1 | 0.13 | 0.25 | 215 | [1] 75.2 | 89.7 (31.4) |
| 4 | 144 –150 | 18.2 | 6.2 | 0.04 | 0.09 | 402.7 | [2] 80.4 | [3] 32.6 ( 6.6) |
| 5 | 150 –153.5 | 13.5 | 7.8 | 0.05 | 0.11 | 372.9 | [2] 74.4 | [3] 44.3 ( 9.0) |
| 6 | 153.5 | 17.6 | 33.1 | 0.21 | | 138.5 | | |
| Residue | | | | | | | | |

[1] Aldehyde—Calculated carbonyl number 286.
[2] Dialdehyde—Calculated carbonyl number 501.
[3] Glycol.

EXAMPLE 6

*Oxidation of Cyclododecylcarboxaldehyde to Cyclododecylcarboxylic Acid*

Cyclododecylcarboxaldehyde (106.8 g.; 0.539 mole; partially unsaturated) was dissolved in 200 ml. of benzene and oxidized by passing a stream of air through the solution for three days.

There was extracted 73.3 g. of acid with dilute aqueous sodium hydroxide. The raffinate was further oxidized for one day with air. An additional 6.7 g. of acid was extracted with dilute aqueous sodium hydroxide from the benzene solution after the second period of oxidation. The total yield of crude acid was 80.0 g. (73.5%).

The partially unsaturated acid was subjected to hydrogenation in ethanol solution with platinum catalyst at 40 p.s.i. hydrogen.

The resulting acid was recrystallized from ethanol-water, M.P. 98–99°. Neutralization equiv. 212 (theory=212).

*Analysis.*—Calculated: C, 73.54%; H, 11.39%. Found: C, 73.90%; H, 11.60%.

EXAMPLE 7

For reference purposes various materials were prepared to characterize certain products of this invention. Cyclododecylcarbinol was reacted with α-naphthylisocyanate to obtain the urethane melting at 107–108° C. The 2,4-dinitrophenyl hydrazone of cyclododecylcarboxaldehyde was found to have a melting point of 164–166° C. Likewise the 2,4-dinitrophenyl hydrazone of cyclododecyldicarboxaldehyde had a melting point of 126–127.5° C.

EXAMPLE 8

*Preparation of Cyclododecyldicarboxylic Acid by the Oxidation of Cyclododecyldicarbinol*

To a solution of 29.8 g. (0.10 mole) of sodium dichromate dihydrate in 75 ml. of glacial acetic acid and 25 ml. of benzene there was added a solution of 24.1 g. (0.106 mole) of cyclododecyldicarbinol in 25 ml. of glacial acetic acid. The glycol was added dropwise in three portions of one-fourth, one-fourth, and one-half: a portion of glycol was added at 10° C., the solution was heated gradually to 40° C., cooled again to 10° C. when the reaction temperature began to drop and the next portion of glycol was added. The oxidation was allowed to proceed by heating at 50° C. for one hour and at room temperature for six hours.

The reaction product was distilled in vacuo to remove solvent. Water was added and the distillation was conducted further in vacuo until a small volume remained. The residue was dissolved with dilute aqueous acid and ether. The ethereal solution was washed with dilute aqueous acid and was then extracted with aqueous sodium hydroxide solution.

The ethereal solution was dried with anhydrous magnesium sulfate and was evaporated to dryness. There was obtained 6.8 g. of neutral material.

The acidic aqueous extracts were discarded.

The alkaline aqueous extract was acidified and extracted with ether. Evaporation of the ether, after drying with anhydrous magnesium sulfate, yielded 11.8 g. of acid with a neutralization equivalent of 160.

The acid was recrystallization from chloroform-heptane. The first crop, 1.3 g., melted at 179–198° C. After reprecipitation from aqueous solution in the presence of a small amount of the sodium salt of ethylene diamine tetraacetic acid to complex the trace chromium salts found in the oxidation, the acid was recrystallized from acetic-water solution. The resulting acid melted at 201–204° C. and had a neutralization equivalent of 126,129 (theory=128 for cyclododecyldicarboxylic acid.)

*Analysis.*—Calculated: C, 65.60%; H, 9.44%. Found: C, 66.2%; H, 9.6%.

It should be noted that although throughout this specification and in the claims the dicarboxaldehyde, dicarboxylic acid and the dicarbinol are described as 1,5 materials, in actually a mixture of the 1,4, 1,5 and 1,6 materials is probably obtained in each case. Thus, these materials may also be described as 1,x-cyclododecane dicarboxaldehyde, 1,x-cyclododecyl dicarbinol, and 1,5-cyclododecane dicarboxylic acid, where in each case x is a number selected from the group consisting of 4, 5 and 6.

What is claimed is:

1. Cyclododecane carboxylic acids having the general formula:

$$C_{12}H_{24-x}(COOH)_x$$

wherein $C_{12}H_{24-x}$ is a cyclododecane radical and x is an integer from 1 to 2, the carboxylic radicals being in the 1,5-positions on the cyclododecane radical when x is 2.

2. The composition of matter cyclododecanecarboxylic acid.

3. The new composition of matter comprising a mixture of 1,4-, 1,5-, and 1,6-cyclododecanedicarboxylic acids.

4. A process for producing mono- and dicarboxylic acid derivatives of cyclododecane which comprises oxidizing with an oxidizing agent an oxygenated derivative of cyclododecane selected from the group consisting of cyclododecylcarboxaldehyde, cyclododecylcarbinol, 1,5-cyclododecanedicarboxaldehyde and 1,5-cyclododecanedicarbinol at a temperature in the range of 20 to 100° C. and at a pressure between 15 and 100 p.s.i.g. and recovering a cyclododecanecarboxylic acid, said oxidizing agent being selected from the group consisting of an oxygen-containing gas, chromic acid in sulfuric acid, and sodium dichromate in acetic acid.

5. The process of claim 4 in which the oxygen-containing gas is air.

6. The process of claim 5 in which the air is contacted with the oxygenated derivative in the presence of a hydrocarbon solvent.

7. The process of claim 4 in which the oxygen-containing gas is contacted with the oxygenated derivative in the presence of a cobalt catalyst and acetic acid.

8. The process for preparing cyclododecanedicarboxylic acid which comprises oxidizing cyclododecanedicarboxaldehyde with an oxidizing agent selected from the group consisting of an oxygen-containing gas, chromic acid in sulfuric acid, and sodium dichromate in acetic acid at temperatures of 20 to 100° C. and pressures of 15 to 100 p.s.i.g.

9. The process for preparing a mixture of 1,4-, 1,5-, and 1,6-cyclododecanedicarboxylic acids which comprises oxidizing a mixture of 1,4-, 1,5-, and 1,6-cyclododecanedicarboxaldehyde with an oxidizing agent selected from the group consisting of an oxygen-containing gas, chromic acid in sulfuric acid, and sodium dichromate in acetic acid at temperatures of 20 to 100° C. and pressures of 15 to 100 p.s.i.g.

10. The process for preparing cyclododecanecarboxylic acid which comprises oxidizing cyclododecylcarbinol with an oxidizing agent selected from the group consisting of an oxygen-containing gas, chromic acid in sulfuric acid, and sodium dichromate in acetic acid at temperatures of 20 to 100° C. and pressures of 15 to 100 p.s.i.g.

11. The process for preparing 1,5-cyclododecanedicarboxylic acid which comprises oxidizing 1,5-cyclododecyldicarbinol with an oxidizing agent selected from the group consisting of an oxygen-containing gas, chromic acid in sulfuric acid, and sodium dichromate in acetic acid at temperatures of 20 to 100° C. and pressures of 15 to 100 p.s.i.g.

References Cited in the file of this patent
UNITED STATES PATENTS 2,437,600    Gresham et al.    Mar. 9, 1948
2,879,299    Buchner et al.    Mar. 24, 1959

OTHER REFERENCES

Rodd: "Chemistry of Carbon Compounds," vol. IIIA, Aromatic Compounds, page 541, 1954.

Meyer: "Pharmazeutische Zeitung," vol. 82, 1937, page 3 (translation in Div. 38).

Groggins: "Unit Processes in Org. Chem.," 4th ed., 1952, pages 415–419, 434.

(Copies available in Sci. Library.)